United States Patent
Lee et al.

(10) Patent No.: US 12,098,892 B2
(45) Date of Patent: Sep. 24, 2024

(54) LAMINATE FOR RADIATIONAL COOLING, AND METHOD FOR PREPARING THE SAME

(71) Applicants: Hyundai Motor Company, Seoul (KR); Kia Corporation, Seoul (KR); Seoul National University R&DB Foundation, Seoul (KR)

(72) Inventors: Min Jae Lee, Gyeonggi-do (KR); Byung Wook Kim, Seongnam-si (KR); Seung Hwan Ko, Seoul (KR); Jin Woo Lee, Atlanta, GA (US); Yeong Ju Jung, Seoul (KR)

(73) Assignees: Hyundai Motor Company, Seoul (KR); Kia Corporation, Seoul (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 17/833,379

(22) Filed: Jun. 6, 2022

(65) Prior Publication Data

US 2023/0266078 A1 Aug. 24, 2023

(30) Foreign Application Priority Data

Feb. 18, 2022 (KR) ........................ 10-2022-0021689

(51) Int. Cl.
*F28F 13/18* (2006.01)
*B29C 67/20* (2006.01)
(Continued)

(52) U.S. Cl.
CPC .......... *F28F 13/185* (2013.01); *B29C 67/202* (2013.01); *B32B 3/30* (2013.01); *B32B 27/08* (2013.01); *B32B 27/304* (2013.01); *B32B 33/00* (2013.01); *B29K 2027/16* (2013.01); *B32B 2250/246* (2013.01); *B32B 2305/026* (2013.01); *B32B 2307/30* (2013.01); *B32B 2605/00* (2013.01)

(58) Field of Classification Search
CPC ......... B32B 3/30; B32B 27/08; B32B 27/304; B32B 33/00; B32B 2250/246; B32B 2305/026; B32B 2307/30; B32B 2605/00; F28F 13/185; B29C 67/202
See application file for complete search history.

(56) References Cited

U.S. PATENT DOCUMENTS

| | | |
|---|---|---|
| 2012/0045603 A1 | 2/2012 | Zerafati et al. |
| 2014/0376191 A1 | 12/2014 | Hwang |
| 2017/0028431 A1 | 2/2017 | Koo |

FOREIGN PATENT DOCUMENTS

| | | |
|---|---|---|
| CN | 209874635 U | 12/2019 |
| CN | 210399572 U | 4/2020 |

(Continued)

*Primary Examiner* — Stella K Yi
(74) *Attorney, Agent, or Firm* — Slater Matsil, LLP

(57) ABSTRACT

In an embodiment a method for preparing a laminate includes forming a cured film by coating a source material composition including a polymer for a base layer and an inorganic particle for forming a pore, obtaining a porous base layer having a spherical pore derived from the inorganic particle by removing the inorganic particle from the cured film through an etching process and forming a coating layer, which has a repeated pattern, on a surface of the porous base layer.

20 Claims, 2 Drawing Sheets

(51) Int. Cl.
  *B29K 27/00*  (2006.01)
  *B32B 3/30*   (2006.01)
  *B32B 27/08*  (2006.01)
  *B32B 27/30*  (2006.01)
  *B32B 33/00*  (2006.01)

(56) References Cited

FOREIGN PATENT DOCUMENTS

| | | | |
|---|---|---|---|
| CN | 110865193 B    |   | 8/2020 |
| CN | 112151860      | * | 10/2020 |
| JP | 2005213425 A   |   | 8/2005 |
| KR | 1020130105180 A |  | 9/2013 |
| KR | 1020170070361 A |  | 6/2017 |
| KR | 102154072 B1   |   | 9/2020 |
| WO | 2020119680 A1  |   | 6/2020 |

\* cited by examiner

LAMINATE FOR RADIATIONAL COOLING, AND METHOD FOR PREPARING THE SAME

CROSS-REFERENCE TO RELATED APPLICATIONS

This application claims the benefit of priority to Korean Patent Application No. 10-2022-0021689, filed in the Korean Intellectual Property Office on Feb. 18, 2022, the entire contents of which are incorporated herein by reference.

TECHNICAL FIELD

The present disclosure relates to a laminate for radiational cooling, which has excellent radioactivity in infrared light, and excellent reflectivity in ultraviolet light, and a method for preparing the same.

BACKGROUND

In general, energy is essentially consumed for cooling. For example, a general cooling apparatus, such as a refrigerator or an air conditioner, performs a cooling operation by absorbing heat emitted when expanding a compressed refrigerant after compressing the refrigerant using energy. Radiational cooling is a technology for cooling without consuming energy, which differs from the cooling technology of the general cooling apparatus. To improve the radiational cooling efficiency, it is important to excellently control the absorption, the reflectivity, and the radioactivity of light in each wavelength. Most heat is generated from incident sunlight, and sunlight is divided into ultraviolet (UV) light, visible light, and infrared light. When light in each wavelength band is reflected, the inflow of heat from sunlight may be blocked. For example, a black car, which absorbs light well during the day when sunlight is shining, easily increases the internal temperature thereof, but a white car, which reflects well light without absorbing the light, more slowly increases the internal temperature thereof.

The material for such radiational cooling may include a polymer, a multi-layer thin film including an inorganic material or a ceramic material, a radiational cooling material including a metal reflecting layer, or a paint including a white pigment. The polymer material has a higher absorption rate (radiation rate) with respect to an infrared light. However, when the polymer material is left outdoors, ultraviolet light or moisture easily degrades the polymer material and reduces the lifespan of the polymer material due to the characteristic of the polymer material. The multi-layer thin film should have the larger number of stacks to enhance the radiation rate for the infrared light. In this case, the absorption rate of sunlight is increased to make it difficult to accomplish the higher-efficiency radiational cooling performance. In addition, the material including the metal reflective layer may not be applied in real life, due to the oxidation of the metal to degrade the long-term stability, and costs. In addition, the metal material makes total reflection of light, which causes eye fatigue and light spread. The paint including the white pigment does not include a material having a high coefficient of extinction. Accordingly, the paint including the white pigment is insufficient in the radiation rate of the infrared light and the reflective rate of the ultraviolet light.

As an alternative of the problem, Korean Patent Registration No. 2154072 discloses a refrigerant which includes a first material to emit infrared light to cause radiational cooling, and a second material to absorb light having a visible light band, to convert the wavelength of the visible light band, and to emit the converted result, and realizes color in radiational cooling. However, as in this patent, the refrigerator, which includes the mix of the first material to emit the infrared light due to electromagnetic resonance and the second material including a pigment or a semiconductor material, exhibits the insufficient radiational cooling power due to the lower reflective index in ultraviolet light.

Accordingly, there is needed the development of studies and researches on a material exhibiting excellent flexibility, excellent radioactivity in infrared light, and excellent reflectivity in ultraviolet light.

SUMMARY

Embodiments solve the above-mentioned problems occurring in the prior art while advantages achieved by the prior art are maintained intact.

Embodiments provides a laminate, capable of exhibiting excellent flexibility, excellent radioactivity in infrared light, and excellent reflectivity in ultraviolet light, such that the excellent radiational cooling performance is exhibited, and a method for preparing the same.

The technical problems to be solved by the present disclosure are not limited to the aforementioned problems, and any other technical problems not mentioned herein will be clearly understood from the following description by those skilled in the art to which the present disclosure pertains.

According to an embodiment a method for preparing a laminate for radiational cooling is disclosed, which includes forming a cured film by coating a source material composition including a polymer for a base layer and an inorganic particle for forming a pore, obtaining a porous base layer having a spherical pore derived from the inorganic particle for forming the pore, by removing the inorganic particle for forming the pore from the cured film through an etching process, and forming a coating layer, which has a repeated pattern, on one surface of the porous base layer.

In addition, various embodiments provide a laminate for radiational cooling, which includes a porous base layer having a spherical pore derived from an inorganic particle for forming a pore, and a coating layer formed on one surface of the porous base layer and having a repeated pattern.

Various further embodiments provide a radiational cooling material including the laminate for radiational cooling.

Yet other embodiments provide a vehicle including the radiational cooling material.

BRIEF DESCRIPTION OF THE DRAWINGS

The above and other embodiments, features and advantages of the present disclosure will be more apparent from the following detailed description taken in conjunction with the accompanying drawings.

DETAILED DESCRIPTION OF ILLUSTRATIVE EMBODIMENTS

Figure 1:
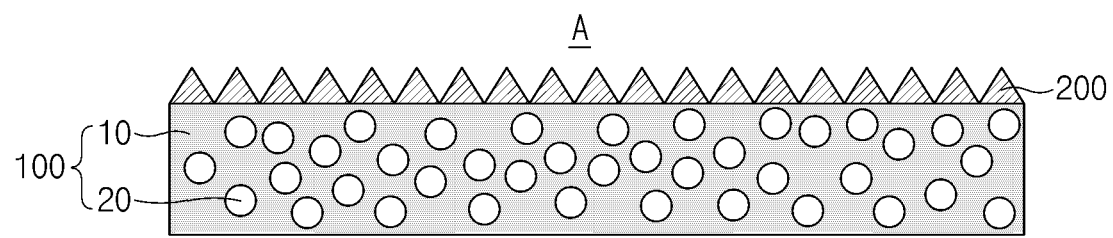
FIG. 1 is a cross-sectional view illustrating a laminate for radiational cooling, according to an embodiment of the present disclosure.

In the following description, when a certain part "includes" a certain component, the certain part does not exclude other components, but may further include other components if there is a specific opposite description.

In the present specification, when a member is positioned on another member "surface" or "above", this includes not only when the member is in contact with the other member, but also when another member is present between the two members.

Method for Preparing Laminate for Radiational Cooling

According to the present disclosure, a method for preparing for radiational cooling includes forming a cured film, obtaining a porous base layer having a spherical component, and a coating layer having a repeated pattern.

Step of Forming Cured Film

In the preset step, the cured film is formed by coating a source material composition including a polymer for the base layer and an inorganic particle for forming a pore.

The polymer for the base layer radiates heat, as ultraviolet light and visible light are reflected, and infrared light is radiated. In this case, the polymer for the base layer may include at least one polymer selected from the group consisting of, for example, a fluorine-based polymer, an acrylic-based polymer, a vinyl-based polymer, and a polysaccharide polymer. In detail, the polymer for the base layer may include at least one polymer selected from the group consisting of polyvinylidene fluoride-hexafluoropropylene (PVDF-HFP), polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, a polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose. In more detail, the polymer for the base layer may include polyvinylidene fluoride-hexafluoropropylene (PVDF-HFP) or the copolymer thereof. In addition, the polymer for the base layer including PVDF-HFP may prevent the prepared laminate from being chemically deformed or corroded, due to the excellent chemical resistance of the polymer.

The base layer polymer may have a weight average molecular weight (Mw) in the range of 350,000 to 1,300,000 g/mol, or the range of 500,000 to 1,000,000 g/mol. When the weight average molecular weight (Mw) of the polymer for the base layer is in the range, the radiation performance of the infrared light is enhanced.

The inorganic particle for forming the pore is easily removed through an etching process. Accordingly, a spherical pore is formed in the porous base.

As long as the inorganic particle for forming the pore is a typical inorganic material which is easily removed through the etching process, the inorganic particle for forming the pore may be employed without a specific limitation. For example, the inorganic particle for forming the pore may include at least one selected from the group consisting of $SiO_2$, $TiO_2$, $Al_2O_3$, Al, and $Si_3N_4$. In detail, the inorganic particle for forming the pore may include $SiO_2$.

In addition, the inorganic particle for forming the pore may have an average particle in the range of 100 nm to 5,000 nm or the range of 400 nm to 4,000 nm. When the average diameter of the inorganic particle for forming the pore is in the above range, the visible light incident into the laminate is effectively reflected. Meanwhile, when the average diameter of the inorganic particle for forming the pore is less than the range, the reflective index of the visible light on the porous base layer may be lowered. When the inorganic particle for forming the pore excesses the range, the mechanical property of the porous base layer may be weakened.

The inorganic particle for forming the pore may have, for example, the shape of a sphere.

The source material composition includes the polymer for the base layer and the inorganic particle for forming the pore. In this case, the source material composition may include the polymer for the base layer and the inorganic particle for forming the pore, which are the ratio of 1:0.8 to 5, or the ratio of 1:1 to 2 in mass ratio. When the mass ratio of the polymer for the base layer and the inorganic particle for forming the pore is in the above range, the porous base layer is mechanically stable while the excellent radiational cooling performance is exhibited. Meanwhile, when the mass ratio of the polymer for the base layer and the inorganic particle for forming the pore is less than the range, the target radiational cooling performance of the porous base layer is not realized. When the mass ratio of the polymer for the base layer and the inorganic particle for forming the pore excesses the range, the porous base layer may be not mechanically stable In addition, the source material composition may further include a solvent. In this case, the solvent disperses the polymer for the base layer and the inorganic particle for forming the pore such that the polymer for the base layer and the inorganic particle for forming the pore are uniformly coated.

The solvent may be employed without specific limitation, as long as the solvent typically disperses the polymer and the inorganic particle. For example, the solvent may include at least one selected from the group consisting of, for example, dimethylformamide, diethylene glycol, dimethyl sulfoxide, N-methylpyrrolidone, butyrolactone, ethylene glycol monoethyl ether, dimethylacetamide, and hexamethyl phosphate triamide. In more detail, the solvent may be dimethylformamide (DMF).

In addition, the solvent may be included in the content of 70 to 90 wt % or 75 to 80 wt %, based on 100 wt % of the source material composition. When the content of the solvent is within the range, the solute may be excellently dispersed. When the content of the solvent is less than the above range, the dispersibility of the solute is lack, so the uniform film may not be formed. When the content of the solvent excesses the above range, the time to form the film may be significantly prolonged due to an excessive amount of solvent.

The present step may further include heating the source material composition after coating the source material composition. The solvent in the source material composition may be evaporated through the heating to form the cured film including the polymer for the base layer and the inorganic particle for forming the pore.

In detail, the present step may further include heating the cured film including the source material composition at 40 to 80° C. for 2 to 5 hours. In more detail, the present step may further include heating the cured film including the source material composition at 50 to 70° C. for 3 to 5 hours. When the temperature is within the above range during the heating process, the cured film may be uniformly formed. To the contrast, when the temperature is less than the above range during the heating process, the process time may be excessively increased. When the temperature exceeds the above range, the cured film may be uniformly formed. When the heating time is in the above range, the cured film may be uniformly formed. To the contrary, when the heating time is less than the range, the solvent, which is not evaporated yet, may remain on the cured film. When the heating time excesses the range, the cured film may not be formed.

Obtaining Porous Base Layer

In the present step, the inorganic particle for forming the pore is removed from the cured film through the etching process, thereby obtaining the porous base layer having the spherical pore derived from the inorganic particle for forming the pore.

For example, the forming of the spherical pore may include removing the inorganic particle for the pore through the etching process employing a weak acid solution. The weak acid solution may remove only the inorganic particle for forming the pore, and the polymer for the base layer may be chemically stable with respect to the weak acid solution. Accordingly, the polymer for the base layer may not react with the weak acid solution.

The weak acid solution removes the inorganic particle for forming the pore by reacting with the inorganic particle for forming the pore, thereby forming the spherical pore. In this case, the weak acid solution may be employed without the specific limitation, as long as the weak acid solution is available in the process of removing the inorganic particle for forming the pore by reacting with the inorganic particle for forming the pore. In detail, the weak acid solution may include hydrofluoric acid. In detail, the weak acid solution may be the weak acid solution.

Forming Coating Layer.

In the present step, a coating layer having a repeated pattern is formed on one surface of the porous base layer.

For example, the present step may include forming a repeated pattern of polymer for the coating layer, which has an opposite shape to the shape of a repeated pattern of a mold, by filling a composition containing the polymer for the coating layer into a groove part of the mold having the repeated pattern; laminating the porous base layer at an opposite side of the repeated pattern of the polymer for the coating layer; and removing the mold.

In more detail, the present step may include forming a repeated pattern of polymer for the coating layer, which has an opposite shape to the shape of a repeated pattern of a mold, by filling a composition containing the polymer for the coating layer into a groove part of the mold having the repeated pattern; laminating the porous base layer at an opposite side of the repeated pattern of the polymer for the coating layer, forming the coating layer by curing the polymer for the coating layer in the mode; and removing the mold. In other words, the coating layer having the repeated pattern may be formed by filling the composition containing the polymer for the coating layer into the mold, curing the resultant structure, and removing the mold.

The repeated pattern may be appropriately adjusted depending on the application field of the laminate for radiational cooling and parts. For example, the repeated pattern may include a pattern having at least one shape selected from the group consisting of a pyramid shape, a truncated pyramid shape, a prism shape, a truncated prims shape, and an embossing shape.

The polymer for the coating layer may be the same as the polymer for the base layer. In this case, the polymer is the same as the polymer described regarding the polymer for the base layer.

In addition, the composition containing the polymer for the coating layer may further include various additives in addition to the polymer for the coating layer. In this case, the additive may be employed without specific limitation, as long as the additive is able to be generally added when preparing a polymer coating layer or a polymer film. In detail, the composition containing the polymer for the coating layer may include a polymer for the coating layer.

A manner of filling a composition containing the polymer for the coating layer into the groove of the mold may be employed without the specific limitation, as long as the manner of filling the composition containing the polymer for the coating layer into the groove of the mold is to typically fill the polymer into the mold. For example, a dip coating manner may be used.

Further, in the present step, as described above, the composition containing the polymer for the coating layer may be filled in the groove of the mold and cured. In this case, the curing may be performed at the temperature of 50 to 90° C. or the temperature of 60 to 80° C. for 1 to 4 hours or for 2 to 3 hours. When the temperature is within the above range during the curing process, the curing is appropriately made. To the contrary, when the temperature is less than the above range or excess the above range during the curing process, the curing is not appropriately made. Accordingly, the laminate may not be prepared. When the curing time is within the range, the curing is appropriately made. To the contrary, when the time is less than the range or when the time excesses the range, the curing is not appropriately made. Accordingly, the laminate may not be prepared.

Laminate for Radiational Cooling

According to the present disclosure, the laminate for radiational cooling includes a porous base layer having a spherical pore derived from an inorganic particle for forming a pore, and a coating layer formed on one surface of the porous base layer and having a repeated pattern.

Referring to FIG. 1, according to the present disclosure, a laminate 'A' for radiational cooling may include a porous base layer 100 and a coating layer 200 formed on one surface of the porous base layer 100.

Porous Base Layer

The porous base layer radiates heat, as ultraviolet light and visible light are reflected, and infrared light is radiated. In this case, the porous base layer has a spherical pore derived from the inorganic particle for forming the pore. Referring to FIG. 1, the porous base layer 100 may include a polymer 10 for a base layer and a spherical pore 20 derived from the inorganic particle for forming the pore.

The polymer for the base layer radiates heat, as visible light is reflected, and infrared light is radiated. In this case, the polymer for the base layer may include at least one polymer selected from the group consisting of, for example, a fluorine-based polymer, an acrylic-based polymer, a vinyl-based polymer, and a polysaccharide polymer. In detail, the polymer for the base layer may include at least one polymer selected from the group consisting of polyvinylidene fluoride-hexafluoropropylene (PVDF-HFP), polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, a polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose. In more detail, the polymer for the base layer may include polyvinylidene fluoride-hexafluoropropylene (PVDF-HFP) or the copolymer thereof.

The spherical pore may have an average diameter in the range of 100 to 5,000 nm, the range of 200 to 4,000 nm, or the range of 400 to 800 nm. When the average diameter of the pore is within the range, the ultraviolet light and the visible light are more scattered, and the radioactivity of the infrared light is improved. To the contrary, when the average diameter of the pore is less than the range, the ultraviolet light and the visible light are less scattered, and the infrared light is less reflected.

The porous base layer may have the porosity in the range of 40 to 70% or the range of 50 to 65%. When the porosity of the porous base layer is within the range, the base layer is mechanically stable, and the excellent radiational cooling performance is exhibited. To the contrary, when the porosity of the porous base layer is less than the range, the target radiational cooling performance of the laminate is not realized. When the porosity of the porous base layer excesses the range, the laminate may be not mechanically stable In addition, the porous base layer may have an average thickness in the range of 600 to 900 μm or the range of 700 to 800 μm. When the average thickness of the porous base layer is less than the above range, the target radiational cooling performance of the laminate is not realized. When the average thickness of the porous base layer excesses the above range, the yield rate corresponding to the thickness of the porous base layer is not obtained. Accordingly, the economic effect is less shown.

Coating Layer

The coating layer having the repeated pattern is used to realize the color of the laminate by reflecting the visible light.

Referring to FIG. 1, the coating layer 200 is formed on the porous base layer 100. In this case, the coating layer 200 may include the polymer for the coating layer, and the polymer for the coating layer may be the same as the polymer for the base layer. In this case, the polymer is the same as the polymer described regarding the polymer for the base layer.

The repeated pattern of the coating layer may be appropriately adjusted depending on the application field of the laminate for radiational cooling and parts. For example, the repeated pattern may include a pattern having at least one shape selected from the group consisting of a pyramid shape, a truncated pyramid shape, a prism shape, a truncated prims shape, and an embossing shape.

The laminate for radiational cooling shows higher reflective indexes for the ultraviolet light having the wavelength band in the range of 200 to 400 nm and the visible light having the wavelength band in the range of 400 to 700 nm.

As described above, according to the present disclosure, the laminate for radiational cooling exhibits excellent flexibility, excellent radioactivity in infrared light, and excellent reflectivity in ultraviolet light, such that the excellent radiational cooling performance is exhibited. Accordingly, the laminate for radiational cooling may be used as a material appropriate to various fields, such as a vehicle, requiring a material showing the excellent radiational cooling performance.

Radiational Cooling Material

The radiational cooling material according to the present disclosure includes the laminate for radiational cooling.

As described above, the radiational cooling material includes the laminate for radiational cooling exhibiting the excellent reflectivity in the ultraviolet light and the visible light, and the excellent radioactivity in the infrared light. Accordingly, the radiational cooling material may be used as a material appropriate to various fields, such as a vehicle, requiring a material showing the excellent radiational cooling performance.

Vehicle

According to the present disclosure, the vehicle includes the radiational cooling material. Accordingly, the vehicle may save cooling energy in summer to show excellent energy efficiency.

Thereafter, an embodiment of the present disclosure will be described in detail. However, the embodiment is provided for the illustrative purpose, but the present disclosure is not limited thereto.

Preparation Example 1: Preparation of Porous Base Layer

A source composition material was prepared by mixing polyvinylidene fluoride-hexafluoropropylene (manufacturer: Arkema, product name: Kynarplex 2801, Mw: 500,000 g/mol), which serves as a polymer for a base layer, and $SiO_2$ (having the average particle diameter of 500 nm) serving as the inorganic particle for forming the pore, at the weight ratio of 1:2, in dimethylformamide serving as a solvent. Thereafter, the source composition material was coated and dried for four hours at the temperature of 60° C., thereby preparing a cured film having the thickness of 750 μm.

Thereafter, $SiO_2$ was removed from the cured film through an etching process to form the spherical pore, thereby preparing the porous base layer (the porosity of 60%).

Embodiment 1: Preparation of Laminate

Polyvinylidene fluoride-hexafluoropropylene (manufacturer: Arkema, product name: Kynarplex 2801, Mw: 500,000 g/mol) was filled in a groove of a mold (having a lattice distance of 110 μm) including polydimethylsiloxane (PDMS) and having a pyramid shape and a repeated pattern. Thereafter, the porous base layer according to Preparation example 1 was laminated on the filled mold and cured at the temperature of 60° C. for three hours. Subsequently, the mold was removed to prepare the laminate for radiational cooling.

Testing Example: Evaluation for Radiational Cooling Performance

The porous base layer in preparation example 1 and the laminate in embodiment 1 were positioned on a styrofoam box, and thermocouples are attached to surfaces, which make contact with the porous base layer in preparation example 1 and the laminate in embodiment 1, of the Styrofoam box. The resultant structure was exposed to the sun for 10 minutes, and then the temperature of the resultant structure was measured. The measurement result is illustrated in FIG. 2.

Figure 2:
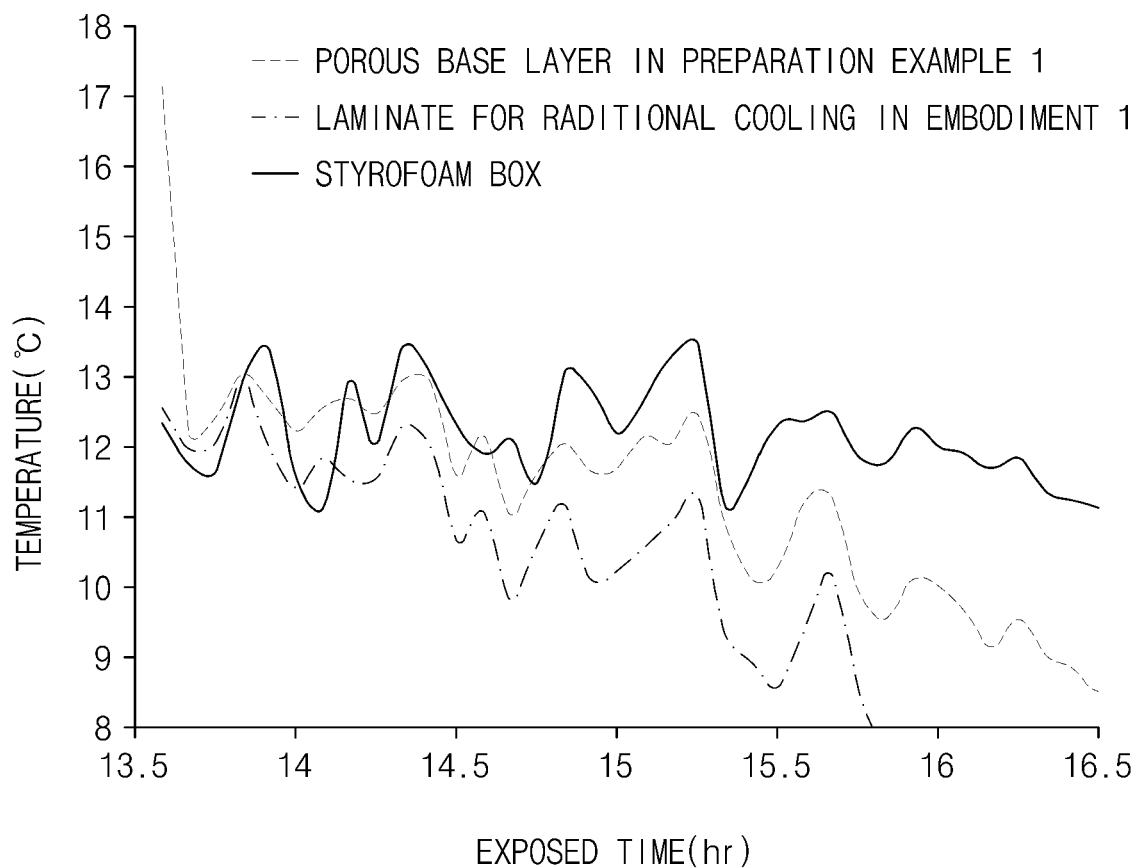
FIG. 2 is a graph illustrating an evaluation result of radiational cooling performance measured according to an embodiment of the present disclosure.

As illustrated in FIG. 2, the temperature of the laminate in embodiment 1 becomes lower than the temperature of the styrofoam box, and lower than the temperature of the porous base layer in preparation example 1.

According to the present disclosure, the laminate for radiational cooling exhibits excellent flexibility, excellent radioactivity in infrared light, and excellent reflectivity in ultraviolet light, such that the excellent radiational cooling performance is exhibited. In addition, the laminate for radiational cooling less absorbs thermal energy due to convection to exhibit the significant excellent radiational cooling power. Accordingly, the laminate for radiational cooling may be used as a material appropriate to various fields, such as a vehicle, requiring a material showing the excellent radiational cooling power.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for preparing a laminate, the method comprising:
    forming a cured film by coating a source material composition including a polymer for a base layer and an inorganic particle for forming pores, wherein the inorganic particle has an average particle size in a range of 400 nm to 800 nm;
    obtaining a porous base layer having a spherical pore derived from the inorganic particle by removing the inorganic particle from the cured film through an etching process; and
    forming a coating layer on a surface of the porous base layer,
    wherein forming the coating layer comprises:
        forming a repeated pattern of a polymer, which has an opposite shape to a shape of a repeated pattern of a mold, by filling a composition containing the polymer for the coating layer into a groove of the mold having the repeated pattern;
        laminating the porous base layer at an opposite side of the repeated pattern of the polymer for the coating layer; and
        removing the mold.

2. The method of claim 1, wherein the polymer includes at least one polymer selected from the group consisting of a fluorine-based polymer, an acrylic-based polymer, a vinyl-based polymer, and a polysaccharide polymer.

3. The method of claim 2, wherein the polymer includes polyvinylidene fluoride-hexafluoropropylene (PVDF-HFP) or a copolymer thereof.

4. The method of claim 1, wherein the inorganic particle includes at least one particle selected from the group consisting of $SiO_2$, $TiO_2$, $Al_2O_3$, Al, and $Si_3N_4$.

5. The method of claim 1, wherein the inorganic particle has an average particle size in a range of 100 nm to 5,000 nm.

6. The method of claim 1, wherein the source material composition includes the polymer and the inorganic particle at a mass ratio of 1:0.8 to 5.

7. The method of claim 1, wherein forming the cured film includes heating the cured film including the source material composition at a temperature of 40 to 80° C. for 2 to 5 hours.

8. The method of claim 1, wherein forming the spherical pore includes removing the inorganic particle through the etching process employing a weak acid solution.

9. The method of claim 1, wherein the polymer for the base layer and the polymer for the coating layer include the same polymer.

10. The method of claim 1, wherein the polymer for the base layer or for the coating layer includes a fluorine-based polymer.

11. The method of claim 1, wherein the polymer for the base layer or for the coating layer includes an acrylic-based polymer.

12. The method of claim 1, wherein the polymer for the base layer or for the coating layer includes a vinyl-based polymer.

13. The method of claim 1, wherein the polymer for the base layer or for the coating layer includes a polysaccharide polymer.

14. The method of claim 1, wherein the inorganic particle includes a $SiO_2$ particle.

15. The method of claim 1, wherein the inorganic particle includes a $TiO2$ particle.

16. The method of claim 1, wherein the inorganic particle includes an $Al2O3$ particle.

17. The method of claim 1, wherein the inorganic particle includes an Al particle.

18. The method of claim 1, wherein the inorganic particle includes an $Si3N4$ particle.

19. A method for preparing a laminate, the method comprising:
    forming a cured film by coating a source material composition including a polymer for a base layer and an inorganic particle for forming pores, wherein the inorganic particle includes a $TiO2$ particle;
    obtaining a porous base layer having a spherical pore derived from the inorganic particle by removing the inorganic particle from the cured film through an etching process; and
    forming a coating layer on a surface of the porous base layer,
    wherein forming the coating layer comprises:
        forming a repeated pattern of a polymer, which has an opposite shape to a shape of a repeated pattern of a mold, by filling a composition containing the polymer for the coating layer into a groove of the mold having the repeated pattern;
        laminating the porous base layer at an opposite side of the repeated pattern of the polymer for the coating layer; and
        removing the mold.

20. A method for preparing a laminate, the method comprising:
    forming a cured film by coating a source material composition including a polymer for a base layer and an inorganic particle for forming pores, wherein the inorganic particle includes an $Si3N4$ particle;
    obtaining a porous base layer having a spherical pore derived from the inorganic particle by removing the inorganic particle from the cured film through an etching process; and
    forming a coating layer on a surface of the porous base layer,
    wherein forming the coating layer comprises:
        forming a repeated pattern of a polymer, which has an opposite shape to a shape of a repeated pattern of a mold, by filling a composition containing the polymer for the coating layer into a groove of the mold having the repeated pattern;
        laminating the porous base layer at an opposite side of the repeated pattern of the polymer for the coating layer; and
        removing the mold.

* * * * *